J. F. O'CONNOR.
SHOCK ABSORBER.
APPLICATION FILED JUNE 6, 1919.
1,421,819.
Patented July 4, 1922.
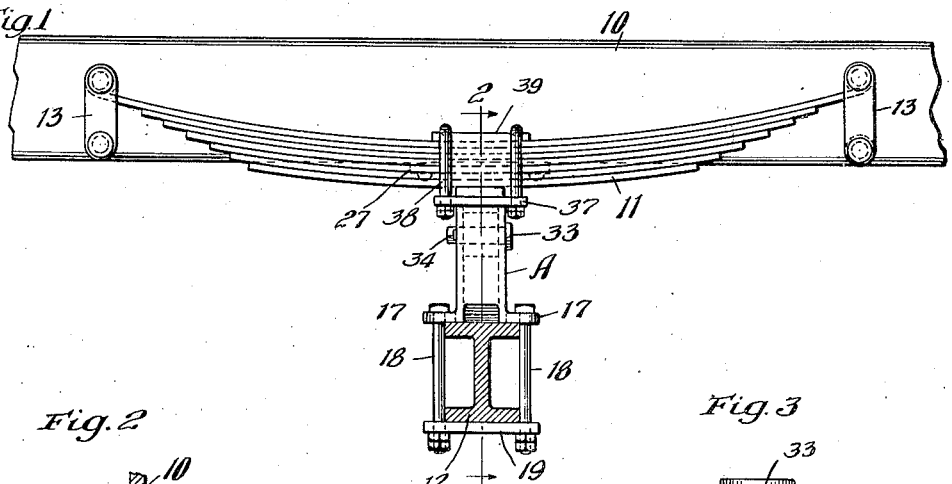
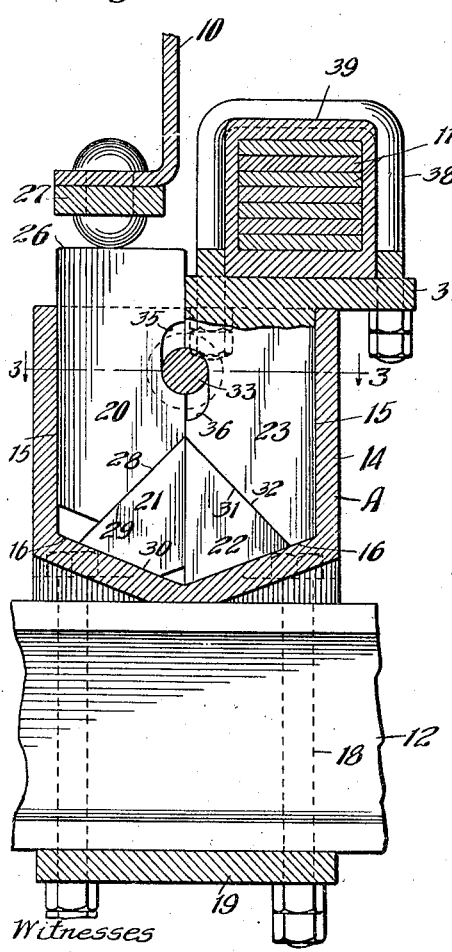
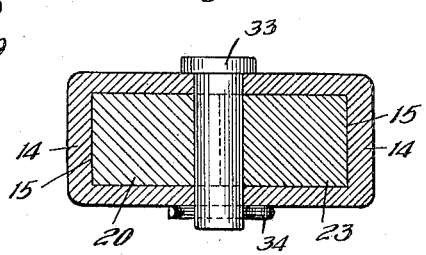
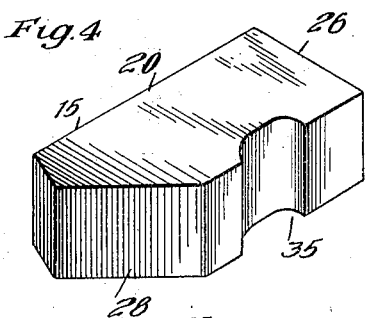
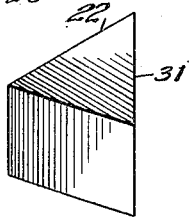
Witnesses
Wm. Geiger
Inventor
John F. O'Connor
By Geo. J. Haight
Atty.

UNITED STATES PATENT OFFICE.

JOHN F. O'CONNOR, OF CHICAGO, ILLINOIS, ASSIGNOR TO WILLIAM H. MINER, OF CHAZY, NEW YORK.

SHOCK ABSORBER.

1,421,819.            Specification of Letters Patent.         Patented July 4, 1922.

Application filed June 6, 1919. Serial No. 302,254.

*To all whom it may concern:*

Be it known that I, JOHN F. O'CONNOR, a citizen of the United States, residing at Chicago, in the county of Cook and State of Illinois, have invented a certain new and useful Improvement in Shock Absorbers, of which the following is a full, clear, concise, and exact description, reference being had to the accompanying drawings, forming a part of this specification.

This invention relates to improvements in shock absorbers.

One object of the invention is to provide an inexpensive shock absorber adapted especially for automobiles and other vehicles wherein the shock absorber acts as an auxiliary to the usual springs to cushion or absorb excessive shocks.

In the drawings forming a part of this specification, Figure 1 is an elevational view of a portion of an automobile chassis, spring and improved shock absorber used in conjunction therewith, the axle being shown in vertical section. Fig. 2 is a vertical, sectional view, upon an enlarged scale, taken on the line 2—2 of Fig. 1. Fig. 3 is a horizontal, sectional view taken substantially on the line 3—3 of Fig. 2. And Figs. 4 and 5 are detail perspective views, respectively, of two of the friction wedge elements employed in my invention.

In said drawings, 10 denotes a side member of an automobile or other vehicle chassis, 11 a semi-elliptic spring of well known form, 12 one of the axles of the vehicle and A the improved shock absorber. The spring 11 is connected to the chassis in a well known manner by compensating links 13—13.

The improved shock absorber A, as shown, comprises an outer shell or casing 14 substantially rectangular in cross section as indicated in Fig. 3. Said shell has vertically extending end walls 15—15 providing vertical friction surfaces, and oppositely and downwardly inclined bottom walls 16—16 forming wedge friction surfaces on the interior thereof. Said shell or casing 14, at the bottom thereof, is provided with outturned perforated ears 17—17 by which the shell is adapted to be secured to the axle 12 as by the bolts 18—18 and the cross plate 19 at the bottom thereof.

Mounted within the shell 14 are a friction wedge block 20, friction wedge block 21, friction wedge block 22, and friction wedge block 23, as indicated in Fig. 2. The friction wedge block 20 normally extends above the top of the shell 14. The top wall of said wedge block 20 indicated at 26 is normally spaced a predetermined limited distance from the under face of a striking plate 27 riveted to the chassis. During the absorption of a shock, it is evident that the chassis and axle will approach each other relatively and after this movement has been continued sufficiently to take up the space between the top 26 of the block 20 and the striking plate 27, continued relative approach of the chassis and axle will serve to force the wedge block 20 downwardly within the shell 14. At its lower end, the block 20 is provided with an inclined wedging face 28 cooperating with a corresponding inclined wedge face 29 on the block 21. The latter at its lower end is provided with an inclined wedge face 30 that slides upon one of the inclined wedging faces 16 of the shell 14. Consequently, as the block 20 is forced downwardly, it will force the wedge block 21 to the right as viewed in Fig. 2 and the latter in turn will force the block 22 to the right and up the other inclined wedge face 16 of the shell. Said block 22 in addition to having its lower face cooperate with the inclined face 16 of the shell, has an additional wedge face 31 cooperable with a corresponding wedge face 32 on the block 23. As the block 22 moves to the right, it in turn will force the block 23 upwardly against the action of the semi-elliptic spring 11.

During the operation above described, it is evident that friction will be generated between the sliding surfaces of the block 20 and the adjacent wall 14 of the shell; between the block 20 and block 21; between the block 21 and inclined lower wall 16 of the shell; between the vertical engaging faces of the blocks 21 and 22; between the block 22 and the other lower wall 16 of the shell; between the block 22 and block 23; and between the block 23 and adjacent wall 14 of the shell. In this manner, large frictional wearing areas are developed, not only increasing the shock absorbing capacity of the device but also serving to prolong its life.

In order to prevent disassembling of the parts of the shock absorbing mechanism, I provide a removable pin 33 extending transversely through the shell 14 as indicated most clearly in Fig. 3, said pin being held by a cotter 34 or other suitable device. The pin 33 passes between the blocks 20 and 23, the latter being suitably cut away as indicated at 35 and 36, respectively, to permit the necessary downward movement of the one and the upward movement of the other. As thus assembled, it is evident that none of the friction wedge blocks can come out of the casing until the pin 33 is removed.

The block 23 is preferably provided at its upper end with an outstanding flange 37 to which the clamping bolts 38 that pass around the spring 11 may be attached. Preferably also, a strap or casing 39 is placed around the leaves of the spring 11 where the bolts 38 are used. In this way, it is impossible for the spring to become separated from the friction device and at the same time, the main spring of the vehicle is utilized in creating the frictional resistance to excessive shocks.

Although I have herein shown and described what I now consider the preferred manner of carrying out the invention, the same is merely illustrative and I contemplate all changes and modifications that come within the scope of the claims appended hereto.

I claim:

1. In a shock absorber for vehicles having a body member, an axle, and a main spring interposed therebetween; a shock absorbing mechanism interposed between said spring and the axle and forming a support for the spring on the axle, said shock absorbing mechanism being arranged for direct actuation by said body member upon relative approach of said body member and axle beyond a predetermined amount.

2. A shock absorber for use with vehicles having a body member, an axle and a main spring interposed therebetween; said shock absorbing mechanism being interposed between the center of said spring and the axle and normally forming a support for said spring on the axle, said mechanism including an element adapted to be directly actuated by said body member and additional elements interposed between said first named element and said main spring for effecting relative separation of said main spring and axle at the point of support of the spring, when the body member and axle approach each other.

3. In a device of the character described, the combination with a body member of a vehicle, an axle, and a main spring interposed between the body member and axle, of means interposed between said body member, axle and spring arranged to translate pressure created by relative approach of the body member and axle into a pressure acting upon and between the axle and spring to separate the latter.

4. In a device of the character described, the combination with a vehicle body member, an axle, and a main spring attached to the body member, of means interposed between the body member, axle and spring arranged to translate pressure created by relative approach of the body member and axle into a separating force between the axle and spring, said means including a plurality of relatively movable friction elements.

5. As an article of manufacture, a shock absorbing device adapted for vehicles and the like, said device comprising a shell having wedging surfaces at one end thereof, a pair of longitudinally movable friction wedge blocks within said shell, and additional wedge blocks interposed between the first named wedge blocks adapted to translate longitudinal movement of one of the first named wedge blocks in one direction into longitudinal movement of the other of the first named wedge blocks in the opposite direction.

6. As an article of manufacture, a shock absorbing device adapted for attachment to a vehicle, said device including, a hollow shell having parallel side walls and oppositely inclined end walls, a pair of longitudinally movable friction wedge blocks within said shell, and a pair of interposed wedge blocks at the end of the shell and cooperating with said inclined ends thereof to translate movement of one of said longitudinally extending blocks in one direction to a movement in the opposite direction of the other longitudinally extending block.

7. In a device of the character described, the combination with a body member of a vehicle, a main spring attached thereto, and an axle, of an auxiliary shock absorbing mechanism, said mechanism comprising a shell attached to the axle, a vertically movable friction wedge block normally extending out of the shell and in alinement with said body member and adapted to be actuated by the latter, a second vertically extending block engaging the spring at its upper end, and means interposed between said blocks adapted to translate downward movement of the first named block into an upward movement of the second named block against the action of said spring.

In witness that I claim the foregoing I have hereunto subscribed my name this 21st day of May, 1919.

JOHN F. O'CONNOR.